United States Patent [19]

Dravid et al.

[11] Patent Number: 5,472,749

[45] Date of Patent: Dec. 5, 1995

[54] GRAPHITE ENCAPSULATED NANOPHASE PARTICLES PRODUCED BY A TUNGSTEN ARC METHOD

[75] Inventors: Vinayak P. Dravid, Glenview; Mao-Hua Teng, Evanston; Jonathon J. Host, Evanston; Brian R. Elliott, Evanston; D. Lynn Johnson, Wilmette; Thomas O. Mason, Evanston; Julia R. Weertman, Evanston; J.-H. Hwang, Evanston, all of Ill.

[73] Assignee: Northwestern University, Evanston, Ill.

[21] Appl. No.: 330,326

[22] Filed: Oct. 27, 1994

[51] Int. Cl.$^6$ ................................................. G03C 1/005
[52] U.S. Cl. .......................... 427/580; 427/212; 427/215; 219/76.5; 75/101; 75/106; 75/332; 75/336; 264/10
[58] Field of Search ............................ 427/580, 215, 427/212; 219/76.15; 75/10.1, 10.6, 332, 336; 264/10; 428/403

[56] References Cited

U.S. PATENT DOCUMENTS

| | | | |
|---|---|---|---|
| 4,316,938 | 2/1982 | Slusarczuk et al. | 428/403 |
| 4,440,800 | 4/1984 | Morton et al. | 427/13 |
| 4,610,718 | 9/1986 | Araya et al. | 264/10 |
| 4,788,080 | 11/1988 | Hojo et al. | 427/204 |

OTHER PUBLICATIONS

"Single Crystal Metals Encapsulated in Carbon Nanoparticles", Ruoff et al, Science, vol. 259, Jan. 15, 1993, pp. 346–348.
"LaC2 Encapsulated in Graphite Nano–Particle", Tomita et al., Jpn. J. Appl. Phys., 32 (1993) Pt. 2, No. 2B. No month.
"Yttrium Carbide in Nanotubes", Seraphin et al, Nature, vol. 362, Apr. 8, 1993, p. 503.
"Magnetic Separation of GdC2 Encapsulated in Carbon Nanoparticles", Subramoney et al, Carbon, vol. 32, No. 3, Apr., 1994, pp. 507–513.
"Catalytic Disproportionation of CO in the Absence of Hydrogen. Encapsulating Shell Carbon Formation:", Nolan et al, Carbon, 1994, 32(3), 477–83 (Abstract). No month.
"Carbon Nanocapsules Encaging Metals and Carbides", Saito et al, J. Phys. Chem. Solids, (1993), 54(12), 1849–60 (Abstract). No month.
"Encapsulation of ZrC and V4C3 in Graphite Nanoballs Via Arc Burning of Metal Carbides/Graphite Composites", Bandow et al., Jpn. J. Appl. Phys., Part 2 (1993), 32(11B), L1677–1680 (Abstract). No month.
"Production and Characterization of Metal Encapsulated Fullerenes", Johnson et al, Mater. Res. Soc. Symp. Proc., (1992) 270 (Abstract). No month.
"Synthesis and Electron–Beam Incision of Carbon Nanocapsules Encaging Yttrium Carbide", Saito et al, Chem. Phys. Let., (1993), 209(1–2), 72–6 (Abstract). No month.
"How to Fill or Empty a Graphitic Onion", D. Ugarte, Chem. Phys. Let., (1993), 209(1–2), 99–103 (Abstract). No month.
"Single Crystal Metals Encapsulated in Carbon Nanoparticles", Ruoff et al., Science, Washington, DC, 1883) (1993), 259(5093), 346–8 (Abstract). No month.
"Production and Characterization of Metallofullerences", Ross et al, J. Phys. Chem, (1992), 96(13), 5231–4 F (Abstract). No month.

*Primary Examiner*—Shrive Beck
*Assistant Examiner*—David M. Maiorana
*Attorney, Agent, or Firm*—Welsh & Katz, Ltd.

[57] ABSTRACT

A method of synthesizing encapsulated nanocrystals inside protective shells is disclosed. This method produces nanocrystals of metals, alloys, and compounds which are individually encapsulated by protective graphite shells which completely separate the nanocrystals from the environment. A separation method is also disclosed which eliminates most of all other debris except the encapsulated nanocrystals from the preparation product.

12 Claims, 1 Drawing Sheet

OTHER PUBLICATIONS

"Mass Spectroscopic and ESR Characterization of Soluble Yttrium–containing Metallofullerences YC82 and Y282" Shinohara et al., J. Phys. Chem, (1992) 96(9), 3571–3 (Abstract). No month.

"Fullerenes With Metals Inside", Chai et al, J. Phys. Chem, (1991), 95(20, 7564–8 (Abstract). (1993), 259(5093), 346–8 (Abstract). No month.

Tomita et al., "LaC$_2$ Encapsulated in Graphite Nanoparticle" Jpn. J. Appl. Phys., 32 (1993).

GRAPHITE ENCAPSULATED NANOPHASE PARTICLES PRODUCED BY A TUNGSTEN ARC METHOD

The U.S. Government has rights in this invention pursuant to NSF Grant DMR-9202574, and DMR-9357513.

This invention relates to a coating process and more particularly to a method of encapsulating nanocrystalline metal, alloy and compound particles inside a protective shell of graphite, including the separation of these encapsulated particles from other materials and debris which may form during the synthesis process.

BACKGROUND OF THE INVENTION

Nanocrystalline particles, i.e. particles with physical size of about 1–100 nm, possess important technological properties ranging from superior mechanical behavior to novel electronic and magnetic properties. Unfortunately, nanocrystalline particles, by virtue of their size and high surface area, are very reactive and interact with their surroundings quickly. For example, metal nanocrystals tend to oxidize rapidly when exposed to air. Therefore, it would be most useful if such nanocrystals could be protected from the environment and still retain their intrinsic properties.

The desirability of the encapsulation of nanoparticles of metals inside graphite shells has been recognized. For instance, magnetic materials (such as metallic iron, cobalt or cobalt-chromium alloy) encapsulated inside graphite shells can find applications as recording media, ferro fluids or magnetic tagging elements. These nanocapsules may be injected into biological systems for use as a drug or a tracing delivery and monitoring system. These materials may also find applications in electronic and opto-electronic industries by virtue of their small particle size, which would give rise to novel quantum phenomena. The encapsulated nanoparticles may be consolidated or dispersed in a matrix to form interpenetrated composites which will have applications in areas which require better mechanical properties or unique electronic and magnetic properties.

Generally the prior art synthesis methods utilize an arc between two graphite electrodes in which one electrode (the anode) is a mixture of graphite and the material to be encapsulated, and the other electrode (the cathode) is graphite. Such a process generally results in isolated instances of encapsulation with a low yield. Furthermore, the process also produces a lot of empty graphite shells, graphite flakes, amorphous debris and graphite nanotubes which are difficult to separate from those which encapsulate the material of interest.

Other methods suffer from surface contamination by impurities, which can greatly change the desired properties of a bulk sample. The inert gas condensation method is one of the cleanest ways to produce nanophase materials. Because the material is physically evaporated in the absence of any precursors, there are no contaminants left on the surface of the particles, which eliminates a common problem with chemical methods. However, this method results in very small bulk samples due to the low production rate, and the properties measured from such small samples may not represent those of bulk nanophase materials. An arc synthesis method circumvents or minimizes many of these problems.

Therefore an object of the subject invention is nanocrystal encapsulation in graphite shell, and a method of making such a product.

A further object of the subject invention is a method to separate encapsulated nanocrystals from other debris.

These and other objects are attained by the subject invention which uses a tungsten arc method to produce graphite-encapsulated nanocrystals. An arc chamber is filled with an inert or reducing gas. A tungsten rod is used as a nonconsumable cathode. The anode is made up of the material which is to be synthesized into nanocrystalline form, for example a metal or alloy. The anode material could be a block or shot of material of interest and is held in a graphite crucible. In the preferred embodiment, the material is separated from the crucible by a few layers of graphite foil to reduce heat loss.

During operation of the arc, it is advantageous to direct a jet of helium (or an inert gas) at the arc for rapid quenching of the metal vapor generated in the arc and reducing the average diameter of the resulting nanophase particles. The product is collected in a suitable collection system, or later scraped from the walls of the arc chamber.

After collection, the product is washed with a strong acid/solvent to dissolve the unwanted unencapsulated particles, but not attack the particles that are encapsulated in graphite shells. The undissolved residue is almost exclusively nanocrystalline particles encapsulated by graphite shells.

BRIEF DESCRIPTION OF THE DRAWINGS

The invention is illustrated with reference to the drawing of which.

DETAILED DESCRIPTION OF THE DRAWINGS

Figure 1:
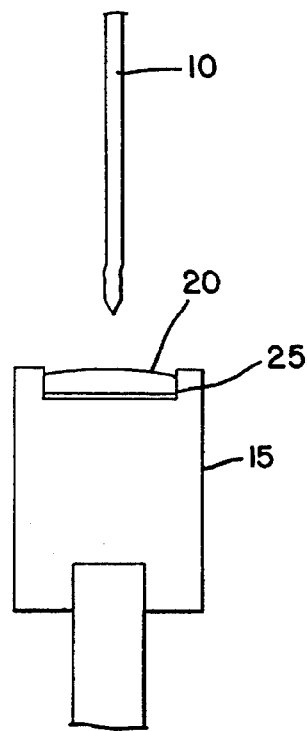
FIG. 1 is a schematic representation of the electrode apparatus of the subject invention.

In FIG. 1 is shown a schematic of a typical apparatus for use in the method of the subject invention. A cathode 10 comprises a tungsten rod, specifically ⅛" diameter, which is spaced from a graphite crucible 15. The anode 20 is a block of the material to be encapsulated, such as nickel, iron, cobalt or cobalt chromium alloy. In theory any material, with magnetic or electronic properties such as metal, alloy or ceramic compound may be used. A few layers (up to three) of graphite foil 25 or other insulating material to reduce heat loss may be placed between the anode 20 and the crucible 15. Nanocrystal vapor is created by generating an arc between the W-cathode 35 and the material anode 40.

Figure 2:
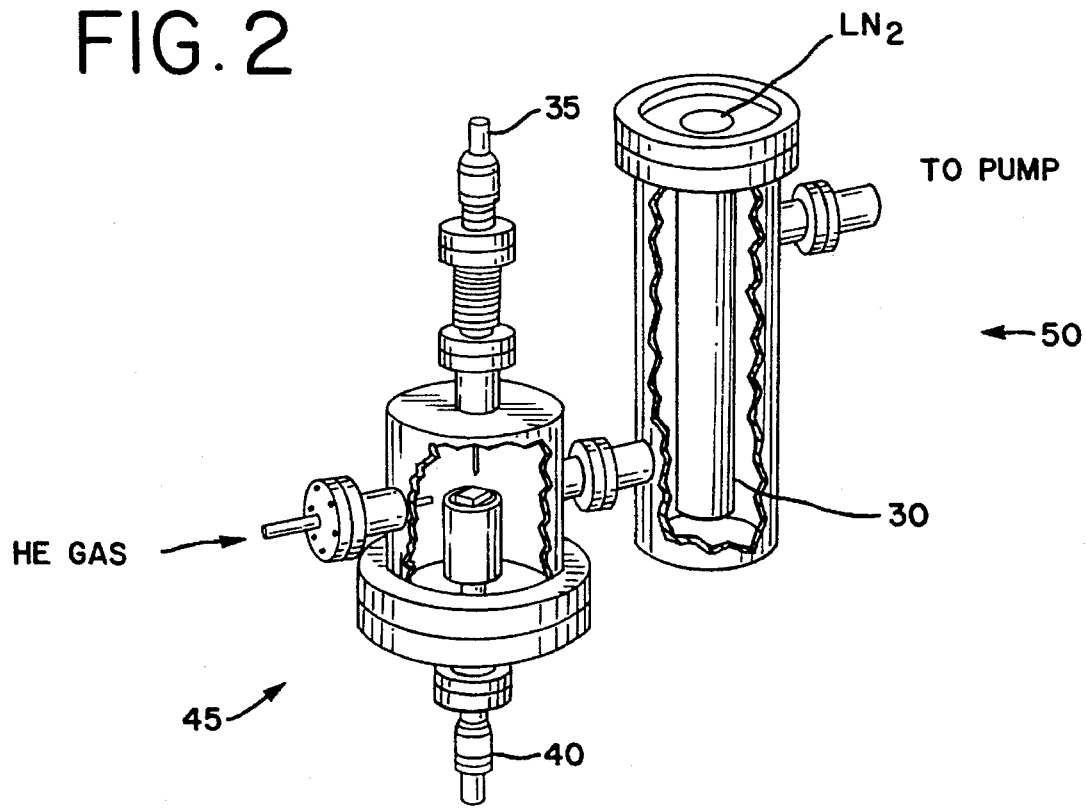
FIG. 2 is a schematic representation of the production and collection chambers of the subject invention.

A schematic of the production chamber 45 and the collection chamber 50 is shown in FIG. 2. Once the arc is started, the helium (or inert) gas stream carry the particles to the collection chamber, where they are captured on a liquid nitrogen cold trap 30. If a helium (or inert) gas stream is not used, then the production chamber doubles as a collection chamber. The particles can be transferred to a microscope grid after the experiment and observed using a transmission electron microscope (TEM).

The system is generally maintained at 1–760 torr helium pressure during the run and preferably at 150–400 torr and most preferably 200 torr. The current used to generate the arc is about 50–200 amperes at about 15–30 DC volts and preferably the current applied is 120 amps at a DC voltage of 20 volts. To produce a small arcing spot which is focused on the material block, the total helium (or inert gas) pressure should be kept at 200 torr or higher.

In operation, a jet of an inert gas, such as helium may be directed at the arc during operations to rapidly quench the material vapor generated, while at the same time reducing the average particle diameter. The product is collected from the arc chamber and by scraping the walls of the collection chamber.

The collected product is then worked with a strong acid or solvent such as $HNO_3$ or aqua regia (3:1 mixture of HCl and $HNO_3$). Unencapsulated particles are dissolved, while those encapsulated by graphite remain untouched; such residue may be dried out and collected.

Analysis of the residue collected as shown may be made through transmission electron microscope (TEM) observations. A TEM image of several nanocrystalline particles, covered with fringes (typically 4–5 in number) could be obtained. The calculations of lattice spacing for these outer fringes may be made and should indicate a spacing of 0.34 nm, which is the spacing of the (002) planes of graphite. X-ray emission spectroscopy on individual particles should show the presence of only the material constituents and carbon (graphite). Electron nanodiffraction from individual particles should indicate the presence of only the desired material and graphite. Transmission EELS data should show that the outer shell fringes are indeed those of graphite, evidenced by the EELS near edge structure of the carbon is transition. In case of magnetic nanocrystals, particles should be attracted to a magnet, indicating that they still possess the magnetism characteristic of the material, and parenthetically, provide for a means of separation.

The following example is illustrative of the method and product of the subject invention.

EXAMPLE 1

A ⅛" diameter tungsten electrode is suspended ½" from the surface of a nickel block supported in a graphite crucible in an apparatus corresponding to FIG. 2. The nickel is heated to above 1600° and melted. Helium is blown at the nickel at a velocity of 56 m/s. An arc is generated between the W-cathode and the Ni-anode. Once the arc is started the helium gas stream carries the particles to the collection chamber where they are captured on a liquid nitrogen cold trap. Total helium pressure is kept at greater than 200 torr. Product is collected by scraping the cold trap walls and subsequently rinsing in aqua regia and filtering using magnetic separation. A TEM analysis of the resulting crystals shows graphite encapsulated nickel particles averaging 6.9 nm in diameter.

Several factors other than the gas velocity can generally influence the final particle size in an arc system, including the total pressure, the gas species, and the source temperature. However, when compared to the effect of the velocity, these factors become insignificant, only the effect of the velocity need be considered.

EXAMPLES 2–5

The same procedure as Example 1 was followed, with a nickel anode and a tungsten cathode with the exception that the helium flow rate was altered in stepwise fashion, graphite encapsulated nickel particles were collected as in Example 1.

The sizes of the Ni particles from the five experiments were measured manually from TEM micrographs, and the results are shown in the Table.

TABLE

| Exp. No. | Gas Velocity m/s | Average Diameter, nm | Standard Deviation, nm | Relative Standard Deviation | Geometric Standard Deviation |
|---|---|---|---|---|---|
| 1 | 56 | 6.9 | 2.5 | 0.36 | 1.44 |
| 2 | 0 | 27.5 | 10.2 | 0.37 | 1.41 |
| 3 | 1 | 30.7 | 12.9 | 0.42 | 1.37 |
| 4 | 9 | 27.6 | 11.4 | 0.41 | 1.36 |
| 5 | 20 | 13.6 | 6.3 | 0.46 | 1.53 |

As can be seen by the above Table, when the helium velocity was less than 10 m/s, the average particle size was about 30 nm, and was generally unaffected by velocity; while at velocities of 20 and 56 m/s the average particle size decreased to 13 nm and 7 nm respectively.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

What is claimed:

1. A method of producing graphite encapsulated nanocrystals, comprising the steps of:

a) setting up a tungsten cathode to be spaced from an anode formed of a metal, alloy or ceramic compound, said anode having magnetic or electronic properties, and held in a graphite crucible within an arc chamber;

b) filling said arc chamber with an inert gas;

c) providing an electric arc between said cathode and said anode;

d) creating particles of said metal in nanocrystalline form encapsulated by said graphite;

e) collecting said particles; and f) washing and separating said particles.

2. The method of claim 1 wherein said anode is selected from a substance selected from the group consisting of nickel, iron, cobalt, and cobalt chromium alloy.

3. The method of claim 1 wherein said inert gas in said arc chamber is maintained at a pressure of from 1 torr to 760 torr.

4. The method of claim 1 wherein said inert gas in said arc chamber is maintained at a pressure of 150–400 torr.

5. The method of claim 1 wherein said arc is operated at about 20 volts and between 50 to 200 amps.

6. The method of claim 1 wherein said arc is provided at 20 volts and 130 amps.

7. The method of claim 1 wherein said inert gas is helium.

8. The method of claim 1 wherein said arc chamber is filled with helium by directing a jet of helium at velocities of between 20 and 60 m/s at said arc.

9. The method of claim 1 wherein said particles are collected, washed in $HNO_3$, aqua regia or strong acid and separated from other residue.

10. The method of claim 1 further including the step of spacing said crucible from said anode with graphite foil.

11. A method of producing graphite encapsulated nickel nanocrystals comprising the steps of:
   a) setting up a tungsten cathode spaced from a nickel anode in a graphite crucible; said cathode, anode and crucible being in an arc chamber;
   b) filling said arc chamber with He;
   c) creating an arc in said arc chamber with about 20 DC volts and about 130 amps of current;
   d) directing a stream of He at said arc at a velocity of between 20–60 m/s and creating a pressure of 200 torr in said arc chamber; and,
   e) depositing, collecting and separating said graphite encapsulated nickel nanocrystals.

12. The method of claim 11 further including the step of separating said nickel anode from said graphite crucible with a layer of graphite foil.

* * * * *